(12) United States Patent
Tochio

(10) Patent No.: US 7,929,451 B2
(45) Date of Patent: Apr. 19, 2011

(54) SWITCH AND PACKET FORWARDING METHOD

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 75 days.

(21) Appl. No.: 12/331,939

(22) Filed: Dec. 10, 2008

(65) Prior Publication Data

US 2009/0154462 A1   Jun. 18, 2009

(30) Foreign Application Priority Data

Dec. 13, 2007   (JP) ................................. 2007-322621

(51) Int. Cl.
*H04L 1/00* (2006.01)
(52) U.S. Cl. ......... 370/249; 370/252; 370/392; 370/400
(58) Field of Classification Search .................. 370/249, 370/252, 392, 400
See application file for complete search history.

(56) References Cited

U.S. PATENT DOCUMENTS

| | | | |
|---|---|---|---|
| 2005/0053079 A1* | 3/2005 | Havala | 370/400 |
| 2005/0201273 A1* | 9/2005 | Shimizu | 370/216 |
| 2007/0183415 A1* | 8/2007 | Fischer et al. | 370/389 |

OTHER PUBLICATIONS

"Operation & Maintenance Mechanism for MPLS Networks", ITU-T Series Y: Global Information Infrastructure, Internet Protocol Aspects and Next Generation Networks: Internet Protocol Aspects—Operation, Administration and Maintenance, pp. 1-27, Feb. 2004, Geneva, Switzerland.

"OAM Functions and Mechanisms for Ethernet Based Networks", ITU-T Series Y: Global Information Infrastructure, Internet Protocol Aspects and Next Generation Networks: Internet Protocol Aspects—Operation, Administration and Maintenance, May 2006, pp. 1-70, May 2006, Geneva, Switzerland.

* cited by examiner

*Primary Examiner* — Kevin C Harper
*Assistant Examiner* — Wanda Z Russell
(74) *Attorney, Agent, or Firm* — Katten Muchin Rosenman LLP

(57) ABSTRACT

A switch that performs packet forwarding processing based on a label for a connection in which a communication path is specified by the label, includes a receiving unit that receives loopback information with a label of a first layer used for packet forwarding for a first connection, and a packet processing unit that transmits a first loopback packet having a packet including the loopback information, a label of the first layer, and a label of a second layer used for packet forwarding for a second connection layered on the label of the first layer, and also transmits a second loopback packet having the packet including the loopback information and the label of the second layer.

12 Claims, 14 Drawing Sheets

SWITCH AND PACKET FORWARDING METHOD

CROSS-REFERENCE TO RELATED APPLICATIONS

This application is based upon and claims the benefit of priority of the prior Japanese Patent Application No. 2007-322621, filed on Dec. 13, 2007, the entire contents of which are incorporated herein by reference.

FIELD

The present invention relates to a switch and a packet forwarding method in a communication network in which packet forwarding is performed based on a label.

BACKGROUND

The present invention is related to a connection confirmation method applied to a packet-based network in which a connection is set like in Multiprotocol Label Switching (MPLS). Instead of a conventional SDH/SONET or optical-based network, the packet-based network is required. As a packet transmission technique, the MPLS has gained attention as a platform that provides not only an IP but also existing services such as FR, ATM, TDM, Ethernet, and the like.

The MPLS is different from a conventional routing process using an IP address and is a packet forwarding technique for forwarding a packet based on identification information called "Label" attached to the packet.

In an example of the MPLS network, a communication path which is called a Label Switched Path (LSP) includes a Label Switching Router (LSR) as a corresponding relay device (switch). A packet is forwarded on the LSP. A label (Push) is attached to the forwarded packet at an entrance of the LSP in a Label Edge Router (LER) that is an LSR positioned on a boundary with a non-MPLS network. In each LSR on the LSP, the label of the packet is replaced and then the packet is forwarded (Swap). In an LER corresponding to an exit, the label attached to the packet is removed (Pop).

As described above, the packet forwarding is made possible by referring to the label attached to the packet in the MPLS network. Therefore, it is possible to reduce a delay time by omitting complicated processing such as reference to the IP address and search of a routing table in each router like in the conventional routing in order to speed up the packet forwarding.

Further, a layering technique is used to achieve scalability of the MPLS network. Thus, it is possible to consolidate the LSPs. If a plurality of labels are layered, that is, the plurality of labels are encapsulated by further attaching another label to the outside of the packet with the label, the LSR refers to only the label on the outside of the packet and performs forwarding without seeing the label information inserted into the packet. Therefore, in a network environment in which MPLS connections increase, it is possible to perform effective connection management by constructing a logical path (a new LSP) of an upper layer in which a plurality of existing LSPs are collected by using this layering technique.

If the LSPs are collected by using the above-described layering technique for maintenance management such as defect detection or communication confirmation of the connections in the MPLS network, it is possible to achieve strength of management and efficiency of the number of management man-hours in specific sections in which the LSPs are collected. Thus, reliability of the connection management can be improved.

On the other hand, for maintenance management in the network in which a packet communication is performed, it is known that the communication of the connection can be confirmed by performing a loopback test between nodes (switches) in the connection.

For example, ITU-T Rec. Y.1711 (February/2004) describes an Operation and Maintenance (OAM) function in an MPLS network and discloses that a loopback is considered to be applied to the MPLS OAM as well.

Further, for maintenance management on a network based on Ethernet, for example, ITU-TRec. Y.1731 (May/2006) discloses that a frame, which includes loopback information on the fact that the MAC address of another node on the same section is set as a destination, is transmitted from the node positioned at the end of the maintenance management section that applies the OAM. Then the communication confirmation can be performed depending on whether or not the frame that includes the loopback information is returned to a transmission source node within a given time.

FIG. 1 illustrates an embodiment that is considered when the OAM technique in the above-described Ethernet is extended to loopback processing on the MPLS network.

In FIG. 1, reference numbers 1 to 5 indicate switches #1 to #5 performing the packet forwarding processing based on labels. The LSP is set to both a direction from the switch #1 to the switch #5 and a direction from the switch #5 to the switch #1. The maintenance management packet transmitted from the switch #1 to the switch #3 includes loopback information and includes an identification label used to identify that the packet is a maintenance management packet, which includes the loopback information, and a label corresponding to the LSP (hereinafter referred to as an LSP label).

When the maintenance management packet is transmitted from the switch #1, the switch #2 replaces the LSP label and then forwards the maintenance management packet. The switch #3 recognizes both the LSP label layer and an identification label layer inside the maintenance management packet and performs the loopback to the switch #1.

On the other hand, FIG. 2 shows an example where the packet forwarding is performed by layering the labels in the part of the connection in which the communication confirmation is desired.

In FIG. 2, reference numbers 1 to 5 indicate the same switches as those of FIG. 1. Further, a new LSP of an upper layer is formed in the section from the switch #2 to the switch #4. That is, when the switch #2 receives the packet transmitted from the switch #1, a new LSP label corresponding to the new LSP (from the switch #2 to the switch #4) is stacked on the outside of the existing LSP label and is then forwarded.

Here, when the maintenance management packet is transmitted to the switch #3 from the switch #1 in the same way as described above, the identification label can not be identified because only the labels of the upper two layers in the switch #3 (the label corresponding to the LSP from the switch #1 to the switch #5 and the label corresponding to the LSP from the switch #2 to the switch #4) are referred to in the switch #3. Therefore, the switch #3 performs the forwarding to the switch #4 without performing the loopback.

Thus, as described above, for example, when the new LSP of the upper layer formed by collecting the plurality of LSPs is formed, there is a problem that the communication confirmation of the LSP of the lower layer cannot be performed effectively.

SUMMARY

It is an object in one aspect of the present invention to provide a unit and a method for performing a loopback in a switch that performs packet forwarding processing based on a label.

According to an aspect of the preset invention, the switch performs the packet forwarding processing based on the label for the connection in which the communication path is specified by the label. The switch includes a receiving unit that receives the packet including the loopback information with the label of the first layer used for the packet forwarding for the first connection; and includes a packet processing unit that transmits the first loopback packet including the loopback information, the label of the first layer, and the label of the second layer used for the packet forwarding for the second connection that is layered on the label of the first layer, and transmits the second loopback packet having the packet including the loopback information and the label of the second layer.

According to an aspect of the preset invention, the switch performs the packet forwarding processing based on the label for the connection in which the communication path is specified by the label, and further is capable of setting the management section by layering to the connection, wherein the switch includes a receiving unit that receives the packet including the loopback information and a packet processing unit that transmits the loopback packet of a first level including the received loopback information, set to the first level such a way that the packet forwarding is performed in the first management section and the loopback packet of a second level including the received loopback information, set to the second level such a way that the packet forwarding is performed in the second management section that is included in the first management section and is also layered with respect to the first management section.

According to an aspect of the present invention, a packet forwarding method that performs the packet forwarding processing based on the label for the connection in which the communication path is specified by the label. The packet forwarding method includes receiving the packet including the loopback information with the label of the first layer used for the packet forwarding for the first connection, and transmitting the first loopback packet having the packet including the loopback information, the label of the first layer, and the label of the second layer used for the packet forwarding for the second connection that is layered on the label of the first layer, the second loopback packet that has the packet including the loopback information and the label of the second layer, that does not have the label of the first layer.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

DETAILED DESCRIPTION OF THE PREFERRED EMBODIMENTS (1) First Embodiment (a) Operation Overview FIG. 3 is a diagram illustrating an operation overview of the present embodiment.

In FIG. 3, reference numbers 1 to 5 indicate the switches performing the packet forwarding according to the present embodiment. These switches perform the packet forwarding based on the label information attached to a header of the packet and are expressed as switches #1 to #5.

In the switches #1 to #5, a bidirectional connection (LSP) corresponding to a direction from the switch #1 to the switch #5 and a direction from the switch #5 to the switch #1 is formed in order to achieve bidirectional data forwarding.

Figure 1:
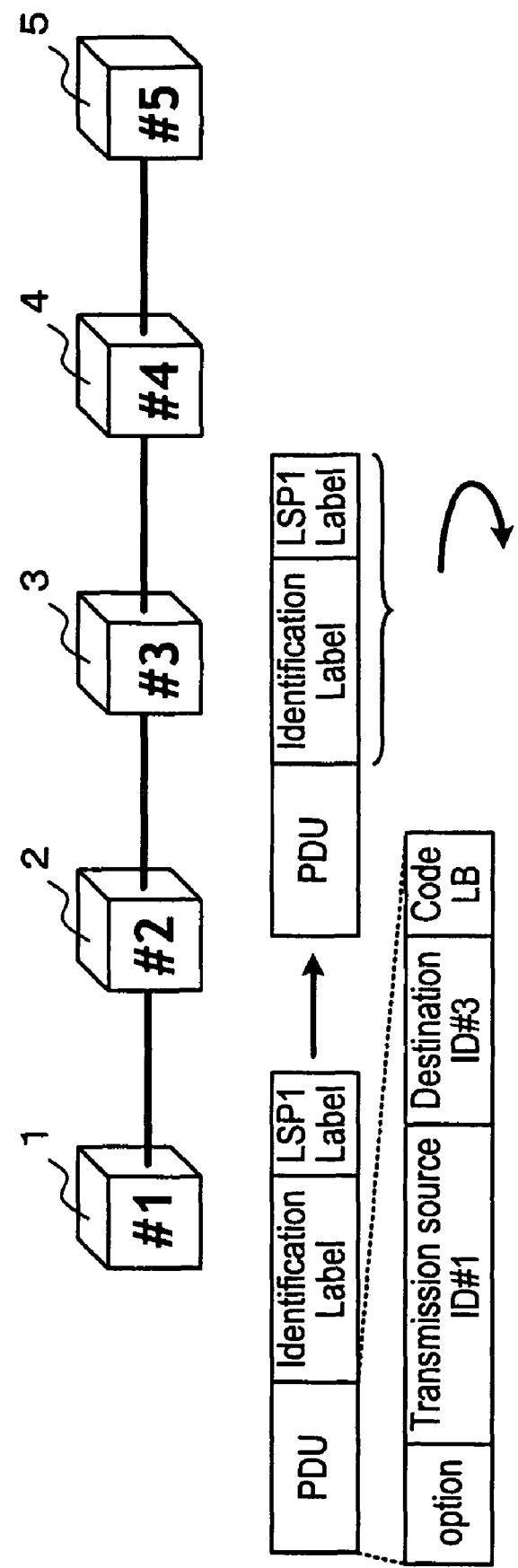
FIG. 1 depicts a loopback on an LSP.
Figure 2:
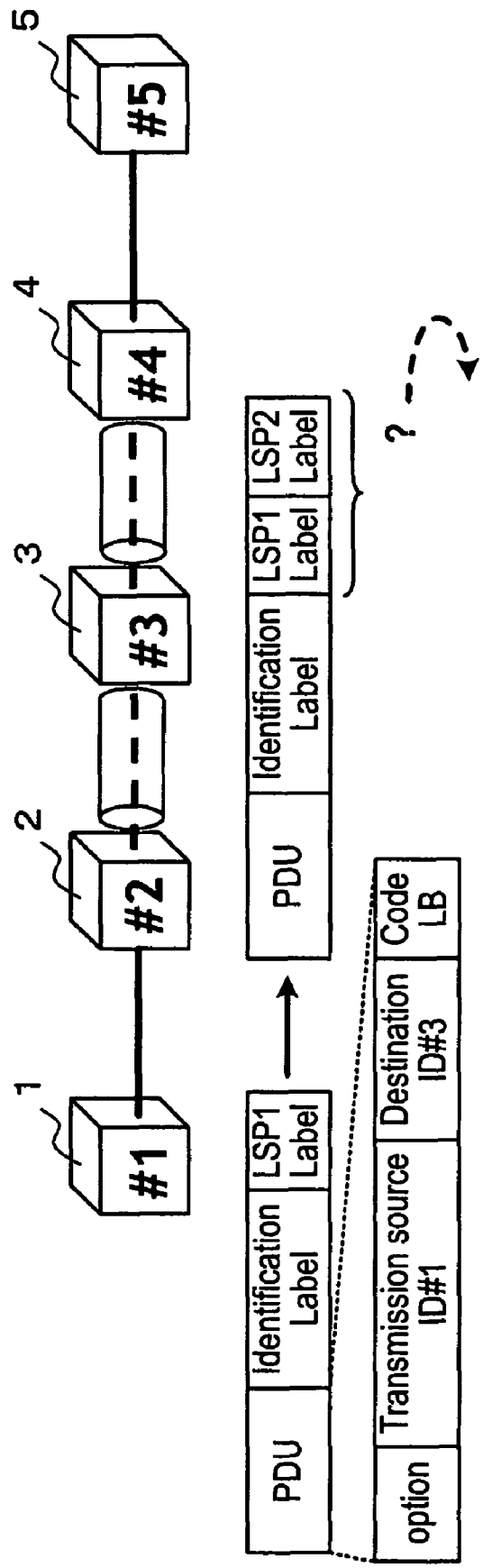
FIG. 2 depicts a loopback on a layered LSP.
Figure 3:
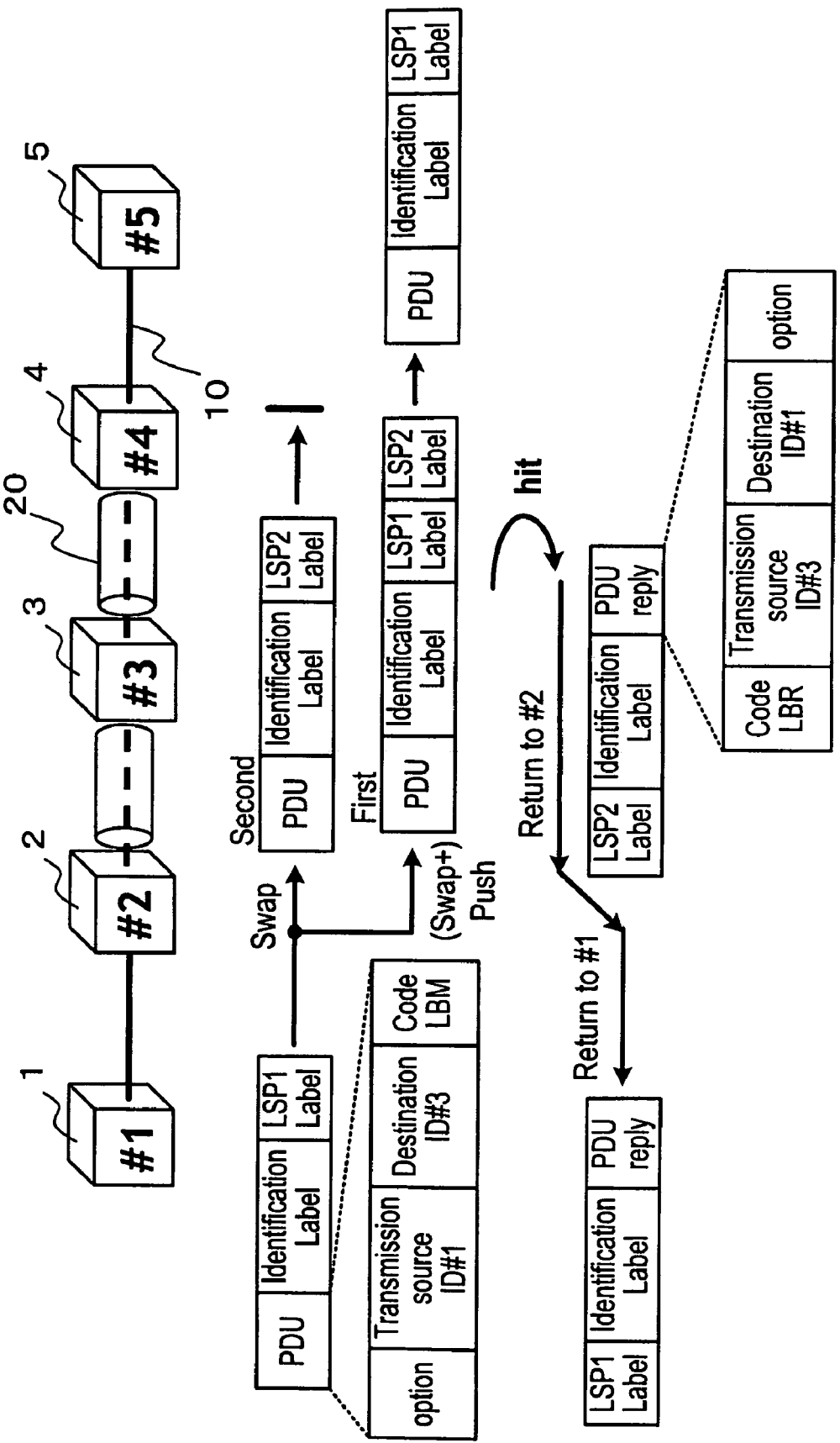
FIG. 3 depicts an operation overview diagram of a first embodiment.

The connection corresponding to the direction from the switch #1 to the switch #5 or the direction from the switch #5 to the switch #1 is an LSP1 (a first layer) represented as the reference number 10 in FIG. 3. In the LSP1, the packet forwarding is performed by using the label corresponding to the LSP1.

The switch #1 attaches a label of the LSP1 to each data packet received through another network, and then transmits the packet. Based on the label information of the LSP1, the packet is forwarded to the switch #2 as a next node.

The maintenance management packet forwarded on the connection according to the present embodiment is, for example, a label for specifying the connection, an identification label for identifying that the packet is a maintenance management packet, and a PDU (Protocol Data Unit) including the loopback information. The content of the loopback information includes, for example, a loopback code, a destination ID, a transmission source ID, and the like.

A loopback is a well-known function for performing communication confirmation in a given section on the network. That is, the communication of the given section is confirmed in such a way that the packet that includes the loopback information is transmitted from the switch at the end of the section in which the communication needs to be confirmed, and then the packet returned from the switch specified as a return point is received by the transmission source.

Further, a loopback code is a code for determining whether to perform a loopback on a switch. A destination ID or a transmission source ID may be, for example, a MAC address, an IP address, and the like, and may include at least one of the addresses.

In the present embodiment, for example, the packet including the loopback information indicating that the switch #3 is the return point is assumed to be transmitted from the switch #1 as the start point. Therefore, the destination ID and the transmission source ID of the loopback information are the information of the switch #3 and the switch #1, respectively.

Furthermore, the identification label for identifying that the packet is a packet having the loopback information in a destination switch is attached to the packet. Therefore, in the switch #1, the label of the LSP1 is attached to the packet on the outside of the identification label.

The switch #2 receives the packet forwarded from the switch #1 and then determines the kind of the packet (the kind of the information included in the packet). The switch #2 refers to the identification label attached to the received packet and then determines that the packet is a packet including the loopback information.

Furthermore, in the process of forwarding the packet to the next switch, the switch #2 attaches a new label used for the packet forwarding on an LSP2 (a second layer), 20 in FIG. 3, that is an upper layer connection to the LSP1, and then transmits the packet. Determining whether or not the label of the LSP2 is attached is based on the information defined in the memory unit inside the switch #2 given in advance by a network management system (NMS), or the like.

If the switch #2 determines that the received packet including the loopback information has the label of the LSP2, two kinds of packets including the loopback information (hereinafter referred to as a loopback packet) are transmitted in the packet forwarding processing. The first loopback packet receives the label of the LSP2 hierarchically on the outside of the label of the LSP1 attached to the packet including the loopback information. The second loopback packet receives the label of the LSP2 after removing the label of the LSP1 attached to the packet including the loopback information.

As well as the packet forwarding processing described above, the transmission source ID included in the packet and the label of the LSP1 in an opposite direction (the label from the switch #2 to the switch #1) are stored in association with each other. The label of the LSP1 in the opposite direction may be obtained by searching for what is given by the NMS and stored in a label table based on the information of the transmission source ID.

When the first loopback packet is received by the switch #3, the label of the LSP2 and the label of the LSP1 which are stacked in the packet are recognized in the switch #3. Then the label of the LSP2 attached to an outside layer of the packet is replaced, and then the packet is forwarded to the switch #4.

The switch #4 is set at the end of the LSP2. When receiving the first loopback packet with the label of the LSP2, the switch #4 removes the label of the LSP2 and then attaches the label of the LSP1. Then the switch #4 forwards the first loopback packet to the switch #5 on the LSP1.

The second loopback packet is transmitted from the switch #2 and is then forwarded to the switch #3 based on the label of the LSP2 attached to the packet.

When the second loopback packet is received by the switch #3, the content of the packet is determined by recognizing the label and the identification label of the LSP2 attached to the packet, and the loopback is performed according to the loopback information. In the loopback processing in the switch #3, the loopback code of the second loopback packet is changed into a reply code. In addition, the switch #3 forms loopback reply information including the fact that the transmission ID (the switch #1) and the destination ID (the switch #3) are replaced. Then the packet is transmitted to the switch #2.

When receiving the second loopback packet that is returned in accordance with the loopback reply information, the switch #2 performs processing to remove the label of the LSP2 attached to the packet. After confirming that the destination ID included in the loopback reply information (the switch #1) corresponds to the transmission source ID stored in the memory unit, the switch #2 attaches the label of the LSP1 to be packet-forwarded to the switch #1 (the label from the switch #2 to the switch #1) to the packet that includes the loopback reply information, and then transmits the packet to the switch #1.

(b) Switch Configuration

Figure 4:
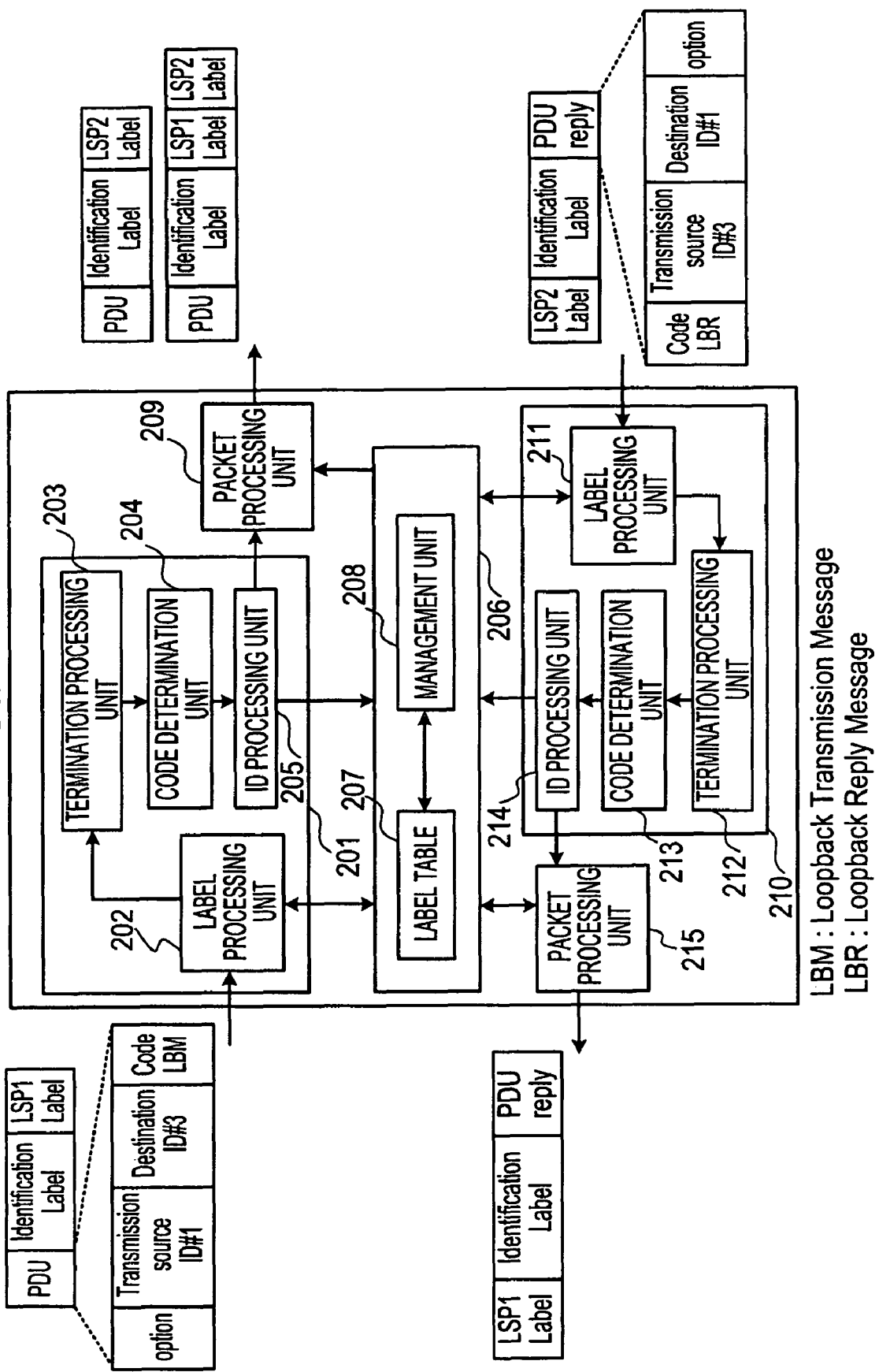
FIG. 4 depicts a configuration example according to the first embodiment.

FIG. 4 is a configuration diagram of a switch (the switch #2) according to the present embodiment.

In FIG. 4, reference numbers 201 and 210 indicate receiving units. Reference numbers 202 and 211 indicate label processing units. Reference numbers 203 and 212 indicate termination processing units. Reference numbers 204 and 213 indicate code determination units. Reference numbers 205 and 214 indicate ID processing units. Reference number 206 indicates a memory unit. Reference number 207 indicates a label table. Reference number 208 indicates a management unit. Reference numbers 209 and 215 indicate packet processing units.

When the switch #2 receives the packet that is forwarded based on the label information, each receiving process is performed by the receiving unit 201.

The label processing unit 202 refers to the LSP label, the identification label, and the like attached to the packet, and then determines the kind of packet or the kind of information to classify the packet. The present embodiment determines that the received packet is a maintenance management packet by recognizing the identification label. Further, by referring to the memory unit 206, it is determined that the process for attaching the label of the LSP2 is to be conducted in the forwarding processing to the next switch.

A packet that is classified as the maintenance management packet by the label processing unit 202 is transmitted to the code determination unit 204 without receiving the termination processing by the termination processing unit 203. The code determination unit 204 determines the kind of code included in the packet. According to the present embodiment, the code determination unit 204 determines that the packet includes the loopback information from the loopback code.

The ID processing unit 205 transmits the information of the transmission source ID (the switch #3) of the packet including the loopback information to the memory unit 206.

The memory unit 206 includes the label table 207 and the management unit 208.

The label table 207 stores the label information given by the NMS and the like. An appropriate label corresponding to the LSP that performs the packet forwarding is retrieved from the label table 207.

The management unit 208 stores the transmission source ID (the switch #1) transmitted from the ID processing unit 205 and the label of the LSP1 in the opposite direction retrieved from the label table 207 (the label from the switch #2 to the switch #1) in association with each other.

The packet processing unit 209 obtains an appropriate label by referring to the memory unit 206 and attaches the label to the packet, and then transmits the packet. In the present embodiment, two kinds of loopback packets are formed and transmitted: the first loopback packet formed by attaching the label of the LSP1 and the label of the LSP2 to the packet that includes the received loopback information; and the second loopback packet formed by attaching the label of the LSP2 to the packet without attaching the label of the LSP1.

When the two kinds of loopback packets are formed by the packet processing unit 209, the packet that includes the received loopback information can be copied. Alternatively, the packet with the loopback information is temporally stored in the memory unit 206 and the like, and then the packet with the loopback information can be newly formed and used based on the information.

The loopback packet that includes the loopback reply information (e.g., a loopback reply code, a destination ID, a transmission source ID, and the like) and that is returned in accordance with the loopback information is received by the receiving unit 210.

As well as in the label processing unit 202 described above, the packet is classified as another kind of packets in the label processing unit 209, and then is transmitted to the termination processing unit 212.

The termination processing unit 212 performs processing to remove the label of the LSP2 from the packet transmitted from the label processing unit 211.

The code determination unit 213 determines the packet transmitted from the termination processing unit 212 by the same process as that of the code determination unit 204. Furthermore, the code determination unit 213 identifies the loopback reply code showing that the packet is returned in accordance with the loopback information.

The ID processing unit 214 refers to the destination ID of the packet including the loopback reply information, and then transmits the information of the destination ID to the memory unit 205.

The memory unit 206 compares the destination ID transmitted from the ID processing unit 214 with the transmission source ID stored in the memory unit 206, and then transmits the LSP label that is stored in association with the transmission source ID to the packet processing unit 215. According to the present embodiment, the label (the label from the switch #2 to the switch #1) of the LSP1, stored in association with the switch #1, is transmitted to the packet processing unit 215.

The packet processing unit 215 attaches the label of the LSP1 obtained from the memory unit 206 to the packet that includes the loopback reply information, and then transmits the reply packet to the switch #1.

The loopback reply information included in the reply packet that is formed by the packet processing unit 215 can be the information formed by copying the loopback reply information that is termination-processed by the termination processing unit 212. Alternatively, the termination-processed loopback reply information is temporally stored in the memory unit 206 or the like, and then, based on this information, loopback information can be newly formed.

(c) Processing Flow

Figure 5:
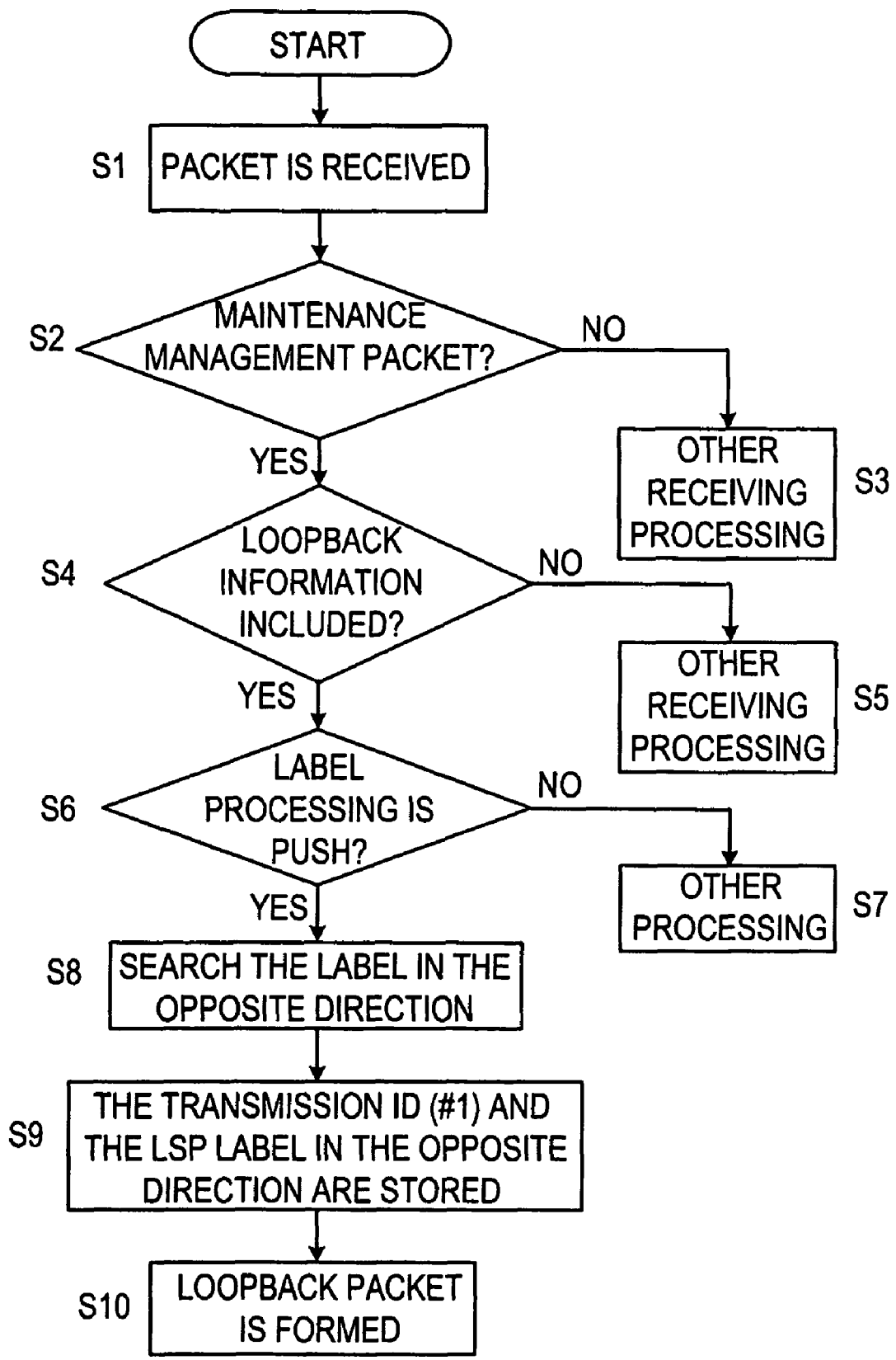
FIG. 5 depicts a processing flow of a packet including loopback information according to the first embodiment.

FIG. 5 shows a processing flow of the case when a switch, the switch #2 in this case, according to the present embodiment receives the packet that includes the loopback information.

In step S1, a packet forwarded based on the label is received.

In step S2, it is determined whether or not the received packet is a maintenance management packet. If the received packet is a maintenance management packet, the process goes to step S4. If the received packet is another packet, the process goes to step S3.

In step S3, a receiving processing based on the kind of packet is performed.

In step S4, it is determined whether or not the packet determined to be the maintenance management packet in step S2 includes the loopback information. If the packet includes the loopback information, the process goes to step S6. If not, the process goes to step S5.

In step S5, processing based on the information included in the packet is performed.

In step S6, if step S4 determines that the maintenance management packet includes the loopback information, it is determined whether or not processing for attaching a label (Push) should be performed in the forwarding of the packet to the next switch. If the processing for attaching the label Push is to be performed, the process goes to step S8. If not, the process goes to step S7.

In step S7, forwarding processing other than the label Push is performed on the packet.

In step S8, if it is determined that the packet forwarding processing to the next switch is the label Push in step S6, the label of the LSP1 in the opposite direction to the label attached to the packet (the label from the switch #2 to the switch #1) is searched based on the transmission source ID (the switch #1) of the packet that includes the received loopback information.

In step S9, the transmission source ID of the packet that includes the loopback information of the received packet and the label of the LSP1 in the opposite direction searched in step S8 are stored in association with each other.

In step S10, two kinds of loopback packets with the label of LSP2 are formed and transmitted.

Figure 6:
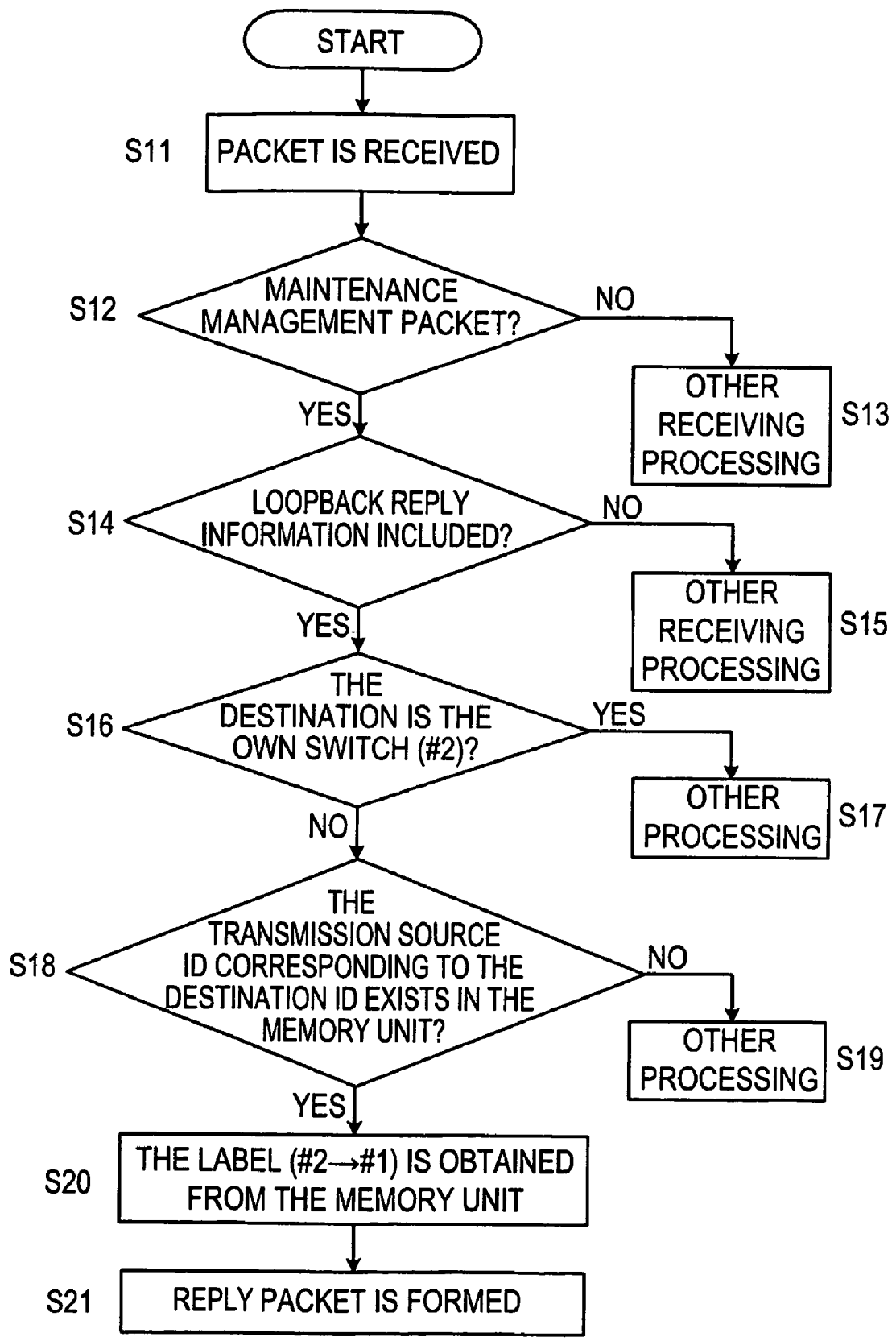
FIG. 6 depicts a processing flow of the packet including loopback reply information according to the first embodiment.

Further, FIG. 6 shows a processing flow of the case when the switch (the switch #2) according to the present embodiment receives the packet that includes the loopback reply information.

In step S11, the packet that is forwarded based on the label is received.

In step S12, it is determined whether or not the received packet is a maintenance management packet. If the packet is a maintenance management packet, the process goes to step S14. If the packet is another packet, the process goes to step S13.

In step S13, the receiving processing based on the kind of packet is performed.

In step S14, it is determined whether or not the packet, determined to be a maintenance management packet in step S12, includes the loopback reply information. If the packet includes the loopback reply information, the process goes to step S16. If not, the process goes to step S15.

In step S15, processing based on the information included in the packet is performed.

If it is determined that the received maintenance management packet includes the loopback reply information, step S16 determines whether or not the destination ID of the packet is the ID of the own switch (the switch #2). If the destination ID is the ID of the own switch, the process goes to step S17. If the destination ID is the ID of a switch other than the own switch, the process goes to step S18.

In step S17, packet discarding processing and the like are performed.

If the destination ID of the packet is the ID of a switch other than the own switch in step S16, step S18 determines whether or not the transmission source ID corresponding to the destination ID (the switch #1) exists in the memory unit. If the corresponding transmission source ID (the switch #1) exists, the process goes to step S20. If not, the process goes to step S19.

In step S19, the packet discarding processing and the like are performed.

In step S20, if it is determined that the transmission source ID (the switch #1) corresponding to the destination ID of the packet exists in the memory unit in step S18, the label of the LSP1 (the label from the switch #2 to the switch #1) stored in the memory unit in association with the transmission source ID is obtained.

In step S21, a reply packet is formed by attaching the label obtained in step S20 to the packet including the loopback reply information, and then the reply packet is returned to the transmission source (the switch #1).

(2) Second Embodiment

Figure 7:
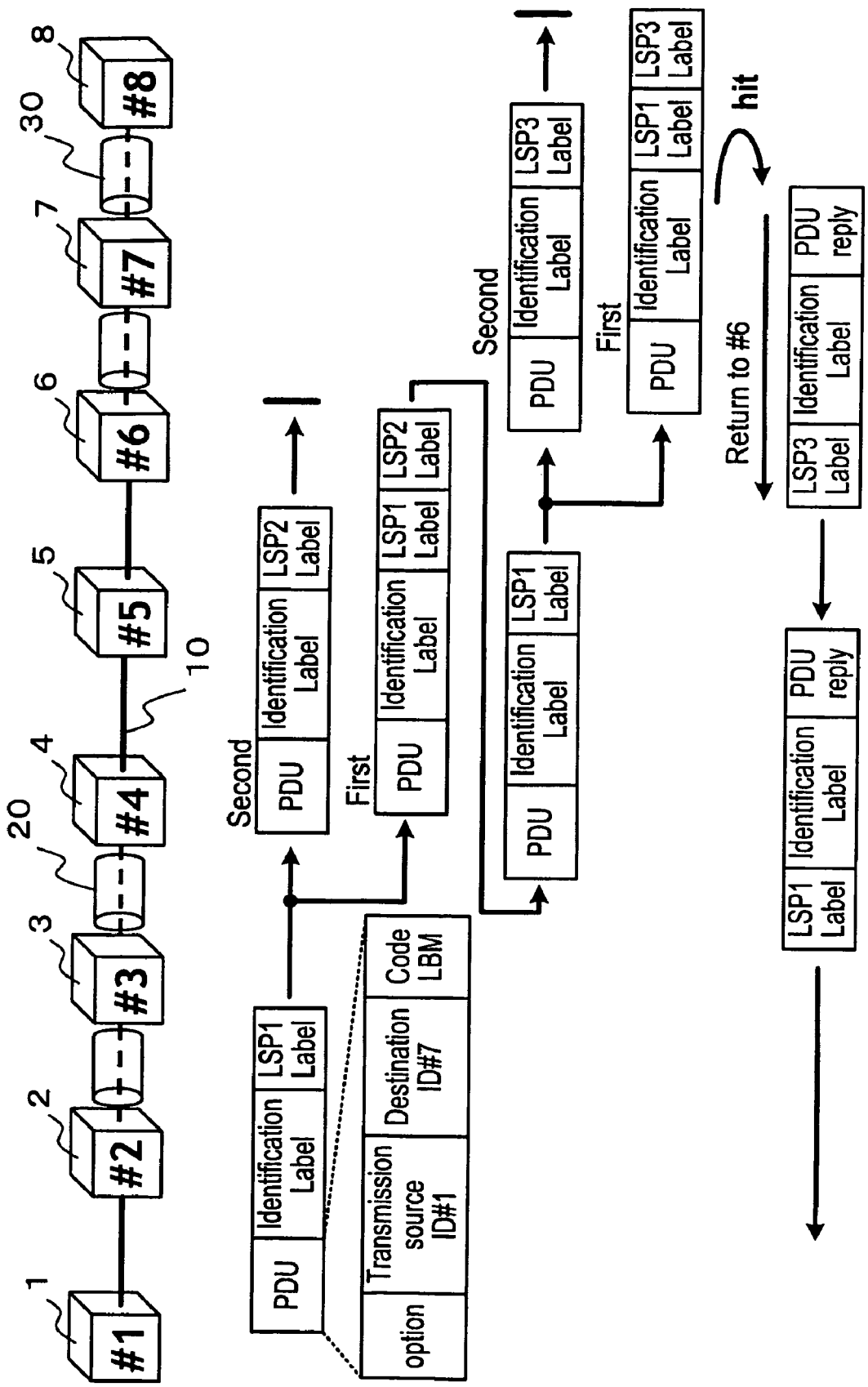
FIG. 7 depicts a configuration example of a second embodiment.

FIG. 7 is a diagram showing an operation overview of packet forwarding according to the present embodiment.

In FIG. 7, reference numbers 1 to 8 are switches for performing the packet forwarding according to the present embodiment. These switches perform the packet forwarding based on the label information attached to the header of the data packet and are expressed as the switches #1 to #8.

In order to achieve the bidirectional data forwarding in the switches #1 to #8, the bidirectional connection (LSP) corresponding to the direction from the switch #1 to the switch #8 and the direction from the switch #8 to the switch #1 is formed. The LSP corresponding to the direction from the switch #1 to the switch #8 or the direction from the switch #8 to the switch #1 is assumed to be the LSP1 (reference number 10 in FIG. 7). In the LSP1, the packet forwarding is performed by using the label corresponding to the LSP1.

The switches #5 to #1 have the same configuration as that of the first embodiment described above. That is, when the switch #2 forwards the loopback packet and the like, the LSP2 (reference number 20 in FIG. 7) as a connection of the upper layer is formed with respect to the LSP1 in the switches #2 to #4. The packet forwarding is performed based on the label information of the LSP2 in this section. Similarly, in the present embodiment, an LSP3 (reference number 30 in FIG. 7) as a connection of the upper layer is formed in the switches #6 to #8 with respect to the LSP1. As well as in the LSP1, bidirectional connections are set in the sections in the LSP2 and the LSP3.

According to the present embodiment, the destination (return point) of the packet, which includes the loopback information transmitted from the switch #1, is not the switch #3 on the LSP2, but is the switch #7 on the LSP3 positioned ahead of the switch #3.

When the switch #2 receives the loopback packet with the label of the LSP1 by the switch #1, the same packet forwarding processing as that of the first embodiment is performed in the switch #2, and then the two kinds of loopback packets that include the loopback information are transmitted. The first and second loopback packets are formed by the same processing as that of the first embodiment.

When the switch #3 receives the second loopback packet through the LSP2, the label and the identification label of the LSP2 attached to the packet are recognized to determine the content of the packet. Since the destination of the packet is the switch #7, the label of the LSP2 is replaced, and then this packet is forwarded to the switch #4.

When the switch #4 receives the second loopback packet, the termination processing for removing the label of the LSP2 attached to the packet is performed, and then the packet is discarded.

On the other hand, as with in the first embodiment, the first loopback packet is forwarded to the switch #5. The label of the LSP1 is replaced in the switch #5, and then the packet is forwarded to the switch #6.

The switch #6 has the same function as that of the switch #2. As with the step described in the first embodiment, the packet that includes the loopback reply information is returned to the switch #1 as the transmission source by the loopback performed in the switch #7 on the LSP3.

In the present embodiment, the return point of the loopback packet is the switch #7 shown in FIG. 7. However, the present embodiment is applicable to the case where the number of the switches for forming the LPS1 increases, and then the loopback needs to be performed in the switch positioned ahead of the switch #7 on the connection.

(3) Third Embodiment (a) Operation Overview

Figure 8:
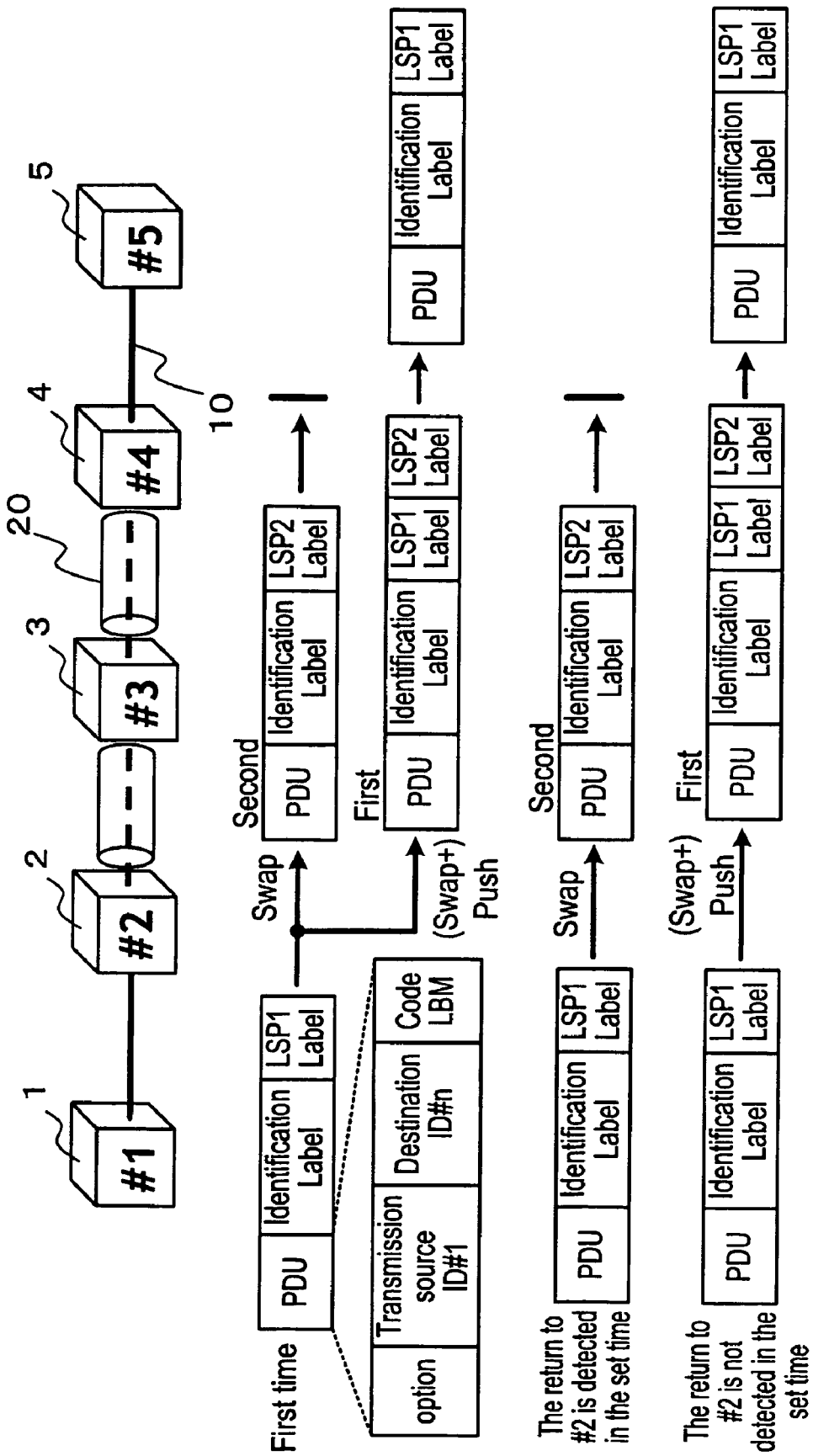
FIG. 8 depicts an operation overview diagram of a third embodiment.

FIG. 8 is a diagram showing an overview of the packet forwarding according to the present embodiment.

In FIG. 8, reference numbers 1 to 5 indicate the same switches #1 to #5 as those of the first embodiment. The same connections LSP1 and LSP2 (the reference numbers 10 and 20, respectively) are formed in transmission and reception of the packet that includes the loopback information.

According to the present embodiment, the switch #2 includes a timer control unit that sets an arbitrary time corresponding to the time required for the packet forwarding in the LSP2 of the switches #2 to #4.

When the switch #2 receives the packet including the loopback information that indicates that the return point is an arbitrary destination, and receives the destination ID of the packet that includes the loopback information for the first time, two kinds of loopback packets that include the loopback information, that is, the first loopback packet and the second loopback packet are transmitted in the packet forwarding processing in the switch #2 in the same manner as in the first embodiment.

If the destination of the packet including the loopback information received by the switch #2 is a switch on the LSP2, the second loopback packet transmitted from the switch #2 is turned back at the destination switch and then is returned to the switch #2.

When the switch #2 receives the returned second loopback packet within a set time, it is determined that the desired loopback is performed because of the transmission of the second loopback packet for the destination of the packet. Then the switch #2 stores the fact that the second loopback packet is transmitted to the destination.

When the destination of the packet including the loopback information received by the switch #2 is not the switch on the LSP2, the second loopback packet transmitted from the switch #2 is termination-processed and discarded by the switch #4.

Therefore, when the return of the second loopback packet is not detected within the set time in the switch #2, it is determined that the desired loopback is not performed depending on the transmission of the second loopback packet for the destination of the packet. Then the switch #2 stores the fact that the first loopback packet is transmitted to the destination.

When the switch #2 receives the packet that includes the loopback information of the same destination as that of the packet that includes the loopback information received in the past, either the first loopback packet or the second loopback packet is transmitted based on the stored information.

Therefore, according to the present embodiment, the switch #2 determines the loopback packet to be transmitted by comparing the destination ID of the packet that includes the received loopback information and the stored information. Thus, the switch #2 does not have to perform useless packet forwarding processing, so that the processing time in the switch #2 can be reduced.

(b) Switch Configuration

Figure 9:
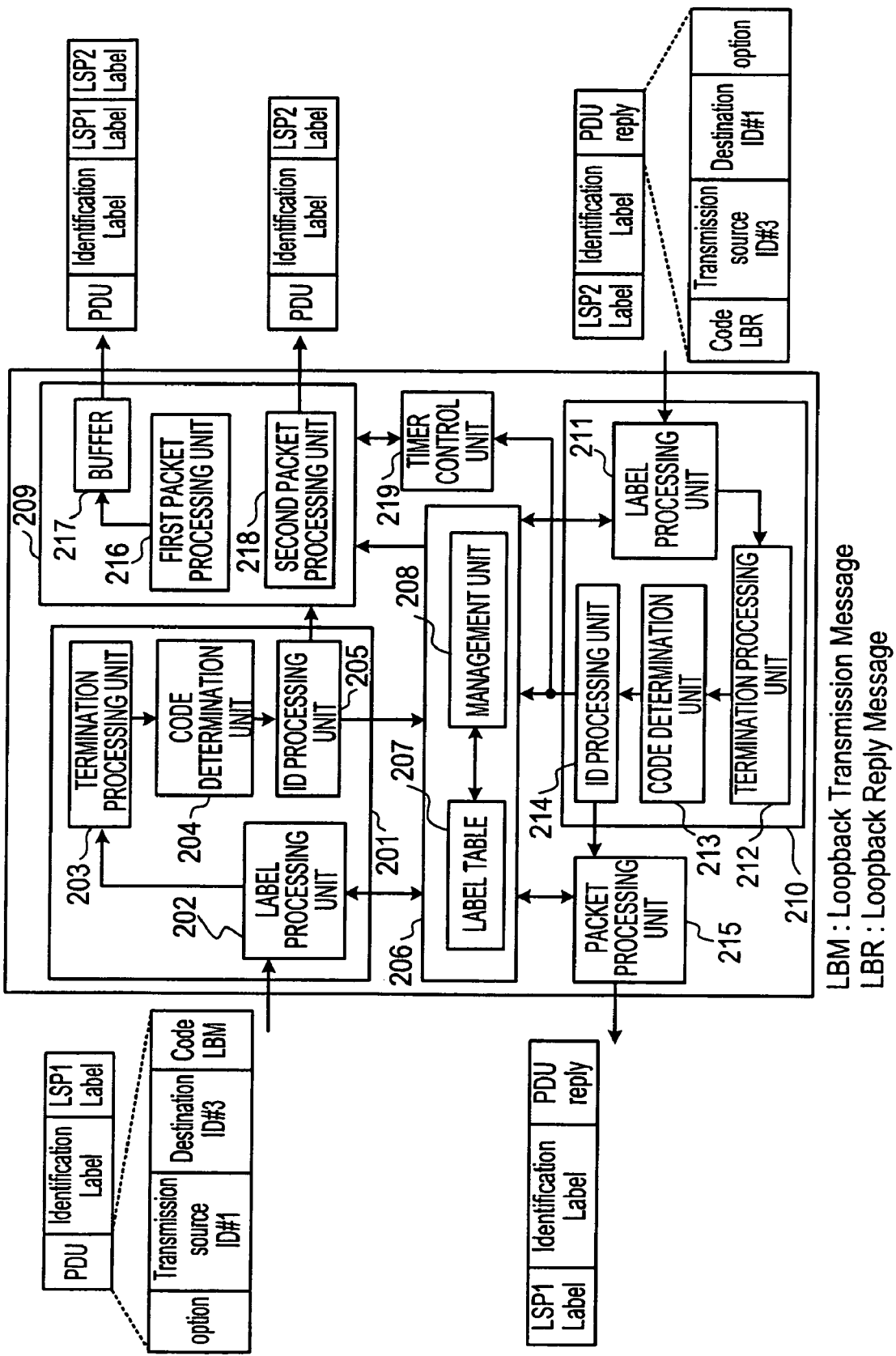
FIG. 9 depicts a configuration diagram according to the third embodiment.

FIG. 9 is a configuration diagram of the switch #2 according to the present embodiment.

In FIG. 9, reference number 216 indicates a first packet processing unit. Reference number 217 indicates a buffer. Reference number 218 indicates a second packet processing unit. Reference number 219 indicates a timer control unit. The same devices as those in the first embodiment are indicated by the same numbers, and the descriptions are omitted.

The first packet processing unit 216 forms the first loopback packet by attaching the label of the LSP1 and the label of the LSP2 to the packet that includes the received loopback information.

The buffer 217 stores the first loopback packet formed in the first packet processing unit 214, and then transmits the first loopback packet stored based on the control of the timer control unit 219.

The second packet processing unit 218 forms the second loopback packet that received the label of the LSP2, but not the label of the LSP1, and then transmits the second loopback packet.

The first and second loopback packets are formed by the same processing as that in the first embodiment.

The timer control unit 219 sets an arbitrary time corresponding to the time required for the packet forwarding on the LSP2 of the switches #2 to #4.

Further, the timer control unit 219 includes a memory that stores the destination ID of the packet and the like that include the received loopback information.

When the timer control unit 219 confirms the return of the second loopback within the set time by comparing the destination ID referred to in the ID processing unit 214 with the information stored in the memory, the timer control unit 219 stores, in the memory, the fact that the second loopback packet is transmitted when the timer control unit 219 receives the destination ID.

Furthermore, if the return of the second loopback packet is not confirmed within the set time, the timer control unit 219 stores, in the memory, the fact that the first loopback packet is transmitted when the timer control unit 219 receives the destination ID of the packet.

Based on comparison results of the destination ID of the packet that includes the loopback information received by the switch #2 with the stored information, the packet processing unit 209 is controlled.

In the embodiment described above, the destination ID and control information are stored in the memory provided in the timer control unit 218. However, the destination ID and the control information can be stored in the memory unit 206 or a memory that is provided separately, and can be referred to by the timer control unit 219.

(4) Fourth Embodiment (a) Operation Overview

Figure 10:
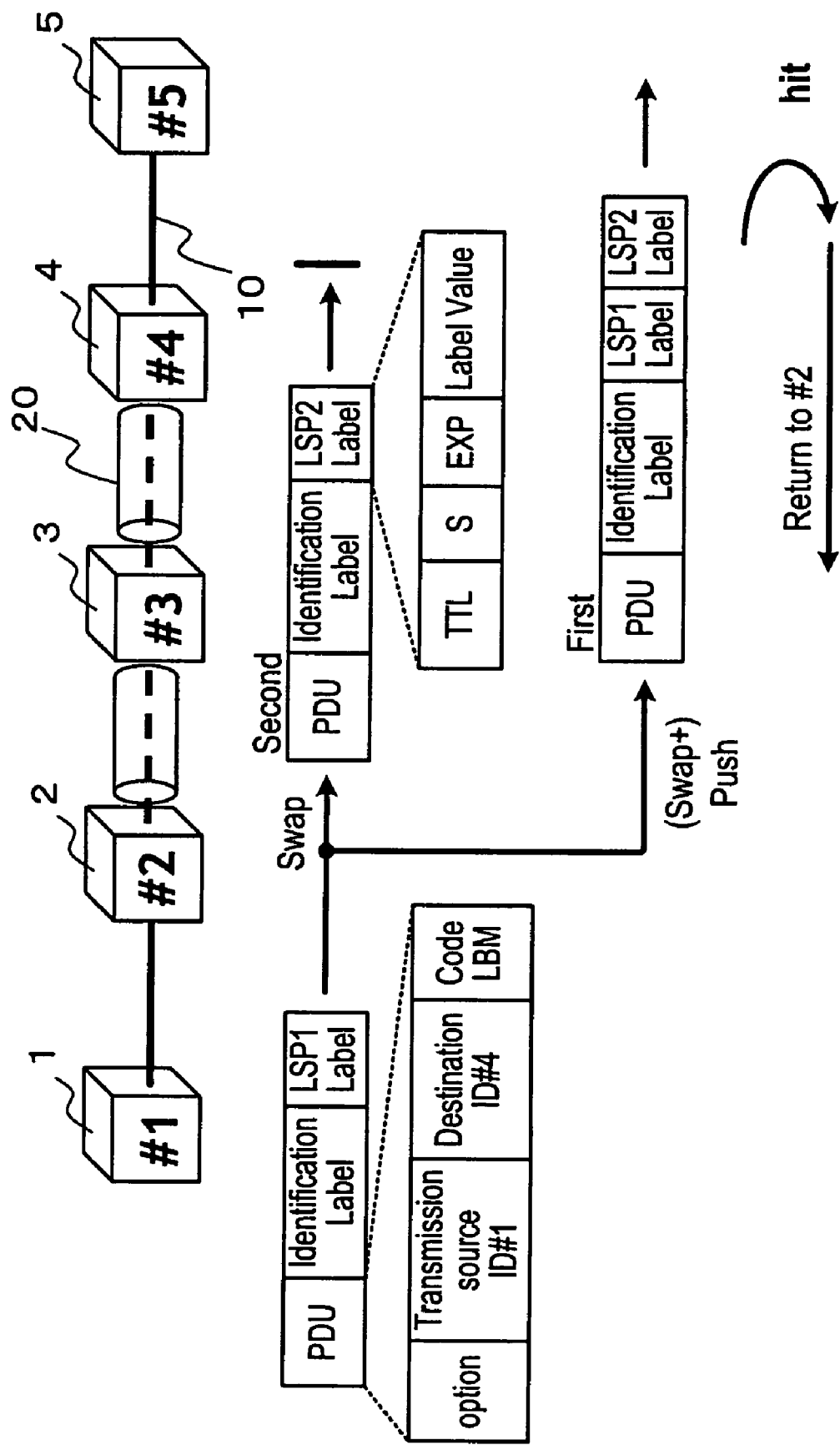
FIG. 10 depicts an operation overview diagram of a fourth embodiment.

FIG. 10 is a diagram showing an operation overview of the packet forwarding according to the present embodiment.

In FIG. 10, reference numbers 1 to 5 indicate the same switches #1 to #5 as those of the first embodiment. The LSP1 and the LSP2 (reference numbers 10 and 20, respectively), as the same connections as those of the first embodiment, are formed in transmission and reception of the packet that includes the loopback information.

According to the present embodiment, the destination of the packet that includes the loopback information transmitted from the switch #1 is the switch #4 that is set at the end of the LSP2. Therefore, the destination ID included in the loopback information is the information corresponding to the switch #4.

Therefore, the two kinds of loopback packets are forwarded by the same processing operation as that of the first embodiment, both the first loopback packet and the second loopback packet undergo the loopback processing in the switch #4, and are then returned to the switch #1.

According to the present embodiment, the packet forwarding processing in the switch #2 is the same as that of the first embodiment.

However, a Time-To-Live (TTL, which is a field in a packet, included in an LSP label, that specifies how many hops are allowed) included in the label of the LSP2 attached to the first loopback packet, and the TTL included in the label of the LSP2 attached to the second loopback packet, are set to different values.

The number of hops from the switch #2 to the switch #4 is calculated in advance, and then the number of hops minus one is set as the value of the TTL included in the label of the LSP2 attached to the second loopback packet. Therefore, the second loopback packet is discarded in the switch one switch before the switch #4. The loopback packet that is undergoes the loopback processing in the switch #4 and is returned is only the first loopback packet.

The present embodiment can limit the number of packets performing the loopback when the loopback packet that includes the loopback information is transmitted, so that malfunctions in the packet forwarding processing can be reduced.

(b) Switch Configuration

Figure 11:
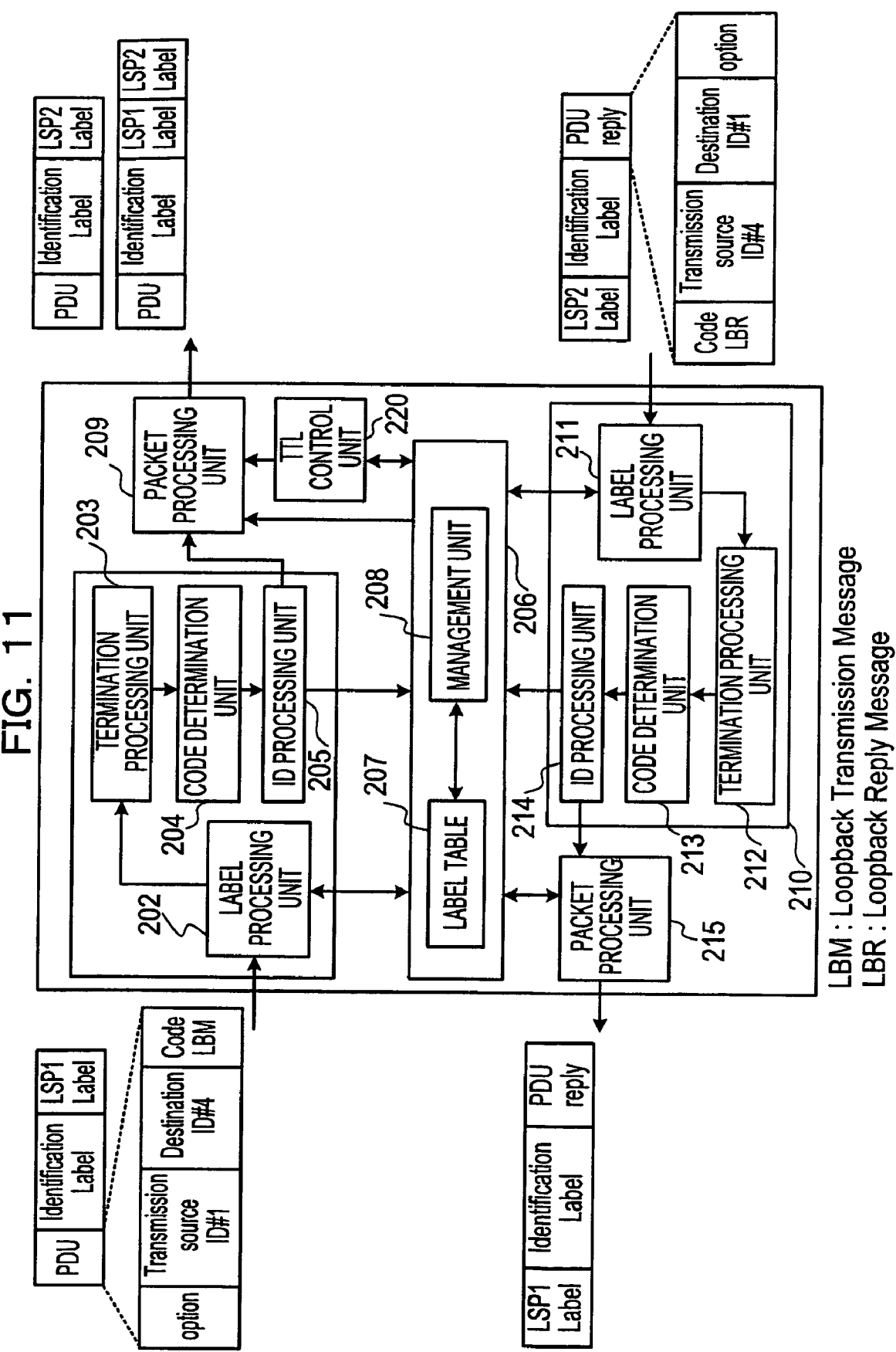
FIG. 11 depicts a configuration diagram of a switch according to the fourth embodiment.

FIG. 11 is a configuration diagram of the switch #2 according to the present embodiment.

In FIG. 11, reference number 220 indicates a TTL control unit. The same devices as those in the first embodiment are indicated with the same numbers as those of the first embodiment, and the descriptions are omitted.

By referring to the memory unit 206, the TTL control unit 220 calculates the number of hops from the switch #2 to the switch #4, and then stores the number of hops minus one as the value of the TTL.

When the second loopback packet is formed in the packet processing unit 209, the value of the stored TTL is set to the TTL field of the label of the LSP2 attached to the packet that includes the loopback information.

(5) Fifth Embodiment (a) Operation Overview

Figure 12:
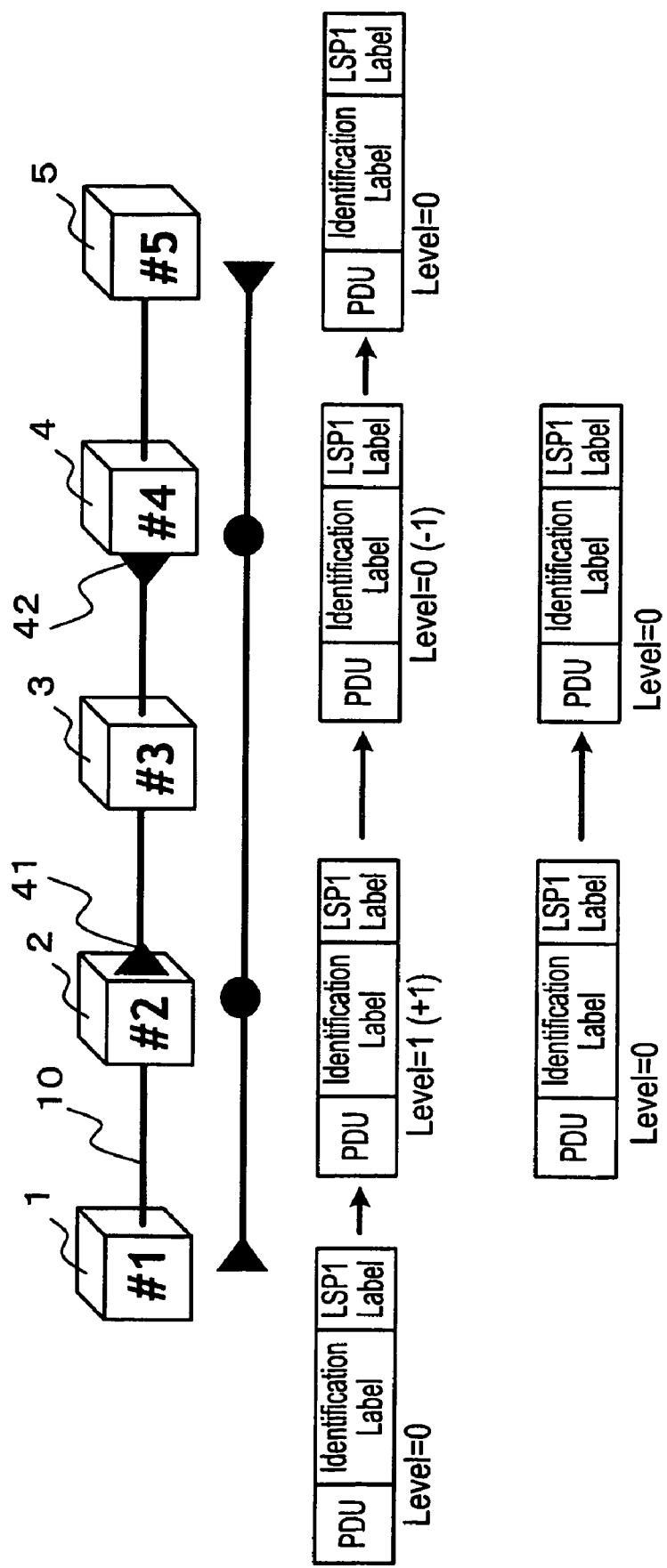
FIG. 12 depicts packet forwarding according to a fifth embodiment.

FIG. 12 is a diagram illustrating the case of setting the management section that is specific to the connection, a socalled Tandem Connection Monitoring (TCM), in which the packet forwarding is performed based on the label information.

In FIG. 12, reference numbers 1 to 5 indicate the switches performing the packet forwarding based on the label information attached to the header of the data packet and are expressed as the switches #1 to #5.

In the switches #1 to #5, the bidirectional connection corresponding to the direction from the switch #1 to the switch #5 and the direction from the switch #5 to the switch #1 is formed and then is assumed to be the LSP1 (reference number 10 in FIG. 12). In the LSP1, the packet forwarding is performed by using the label corresponding to the LSP1.

In FIG. 12, when the communication confirmation is performed in a section included in the section from the switch #1 to the switch #5, for example in the section from the switch #2 to the switch #4, a TCM point that becomes a start point and an end point of the TCM (reference numbers 41 and 42) described above is set to the switch #2 and the switch #4. As a result, as well as management of the section from the switch #1 to the switch #5, management of the section from the switch #2 to the switch #4 can be performed.

The section from the switch #2 to the switch #4 is layered by the management section setting described above with respect to the section from the switch #1 to the switch #5. Thus, the switch #3 included in the section from the switch #2 to the switch #4 is excluded from direct management in the section from the switch #1 to the switch #5.

Hereinafter, it is assumed that the section from the switch #1 to the switch #5 is a first management section, and the section from the switch #2 to the switch #4 is a second management section.

In the case described above, the switch #3 needs to distinguish the maintenance management packet for the first management section (e.g., the maintenance management packet that includes a label for specifying the connection, an identification label for identifying that the packet is a maintenance management packet, and a PDU including the loopback information) from the maintenance management packet for the second management section.

By setting the level of the management section for managing in the identification label or of the PDU included in the maintenance management packet, it is possible to process only the maintenance management packet that is set to the level corresponding to the management section in which the switch is managed in the switch that receives the maintenance management packet.

For example, the switch #1 sets the level of the maintenance section of the maintenance management packet to Level=0 when transmitting the maintenance management packet for the first management section.

When receiving the maintenance management packet for the first management section with Level=0, the switch #2 raises the level of the maintenance management packet to Level=1, and then forwards the maintenance management packet with Level=1 to the switch #3.

Since the switch #3 is a switch that is managed in the second maintenance section corresponding to Level=0, the switch #3 does not process the maintenance management packet even though the maintenance management packet for the first management section with Level=1 is received. Then the switch #3 forwards the maintenance management packet to the switch #4.

When receiving the maintenance management packet for the first management section of Level=1, the switch #4 reduces the level to Level=0, and then forwards the maintenance management packet for the first management section with Level=0 to the switch #5.

On the other hand, as for the maintenance management packet for the second maintenance section, the switch #2 sets the level of the maintenance management packet to Level=0, and then transmits the maintenance management packet with Level=0.

When receiving the maintenance management packet for the second management section with Level=0, the switch #3 performs the processing of the maintenance management packet.

Figure 13:
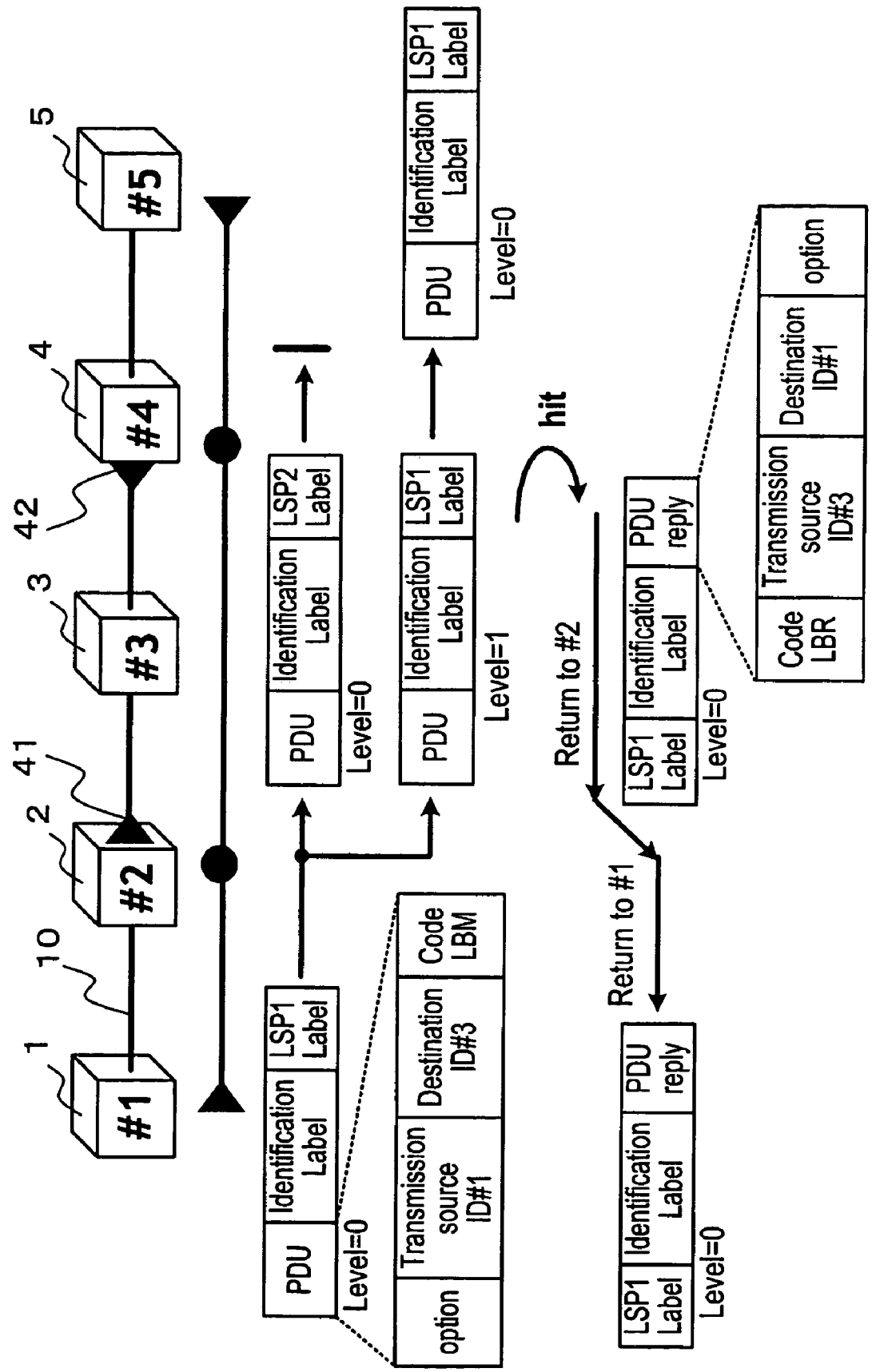
FIG. 13 depicts an operation overview diagram of the fifth embodiment.

FIG. 13 is a diagram showing an operation overview of the present embodiment.

In FIG. 13, the switches shown by the reference numbers 1 to 5 are the same switches #1 to #5 as those of FIG. 12. An LSP1 (reference number 10) for performing packet forwarding based on the label is formed.

Further, as in FIG. 12, the switch #2 and the switch #4 are the TCM points. In the identification label or the PDU included in the maintenance management packet forwarded in the LSP1, the level according to the management section that is managed by the maintenance management packet is set.

In the present embodiment, the maintenance management packet includes the loopback information (e.g., a loopback code, a destination ID, a transmission source ID, and the like) on the fact that the switch #1 is the start point and the switch #3 is the return point. Therefore, the destination ID and the transmission source ID of the loopback information is the information of each of the switch #3 and the switch #1, respectively.

Furthermore, as with the case of FIG. 12, the switch #3 is included in the section from the switch #2 to the switch #4 (the first management section) layered with respect to the section from the switch #1 to the switch #5, and is excluded from the direct management in the first maintenance section.

The switch #1 sets the level of the packet that includes the loopback information to Level=0, and then transmits the packet that includes this loopback information with Level=0.

When receiving the packet that includes the loopback information with Level=0, the switch #2 transmits the packet that includes two kinds of loopback information: the loopback packet of the first level for the first management section with the level set to Level=1; and the loopback packet of the second level for the second management section with the level set to Level=0.

When receiving the loopback packet of the first level for the first management section, the switch #3 forwards the loopback packet to the switch #4 without performing the processing based on the loopback information included in the loopback packet.

When receiving the loopback packet of the first level for the first management section, the switch #4 sets the level of the loopback packet to Level=0, and then forwards the loopback packet with Level=0 to the switch #5.

When receiving the loopback packet of the second level for the second management section, the switch #3 refers to the loopback information included in the loopback packet. If it is determined that the destination of the loopback is the switch #3, the loopback is performed based on the loopback information.

In the loopback processing by the switch #3, the loopback code of the loopback packet of the second level is changed into a reply code. In addition, the loopback reply information indicating that the transmission source ID is replaced with the destination ID is formed and transmitted to the switch #2.

When receiving the loopback packet of the second level that is returned in accordance with the loopback reply information, the switch #2 confirms that the destination ID (the switch #1) included in the loopback reply information corresponds to the transmission source ID (the switch #1) stored in the memory unit. After the confirmation, the switch #2 attaches the label of the LSP1 for forwarding the packet to the switch #1 to the packet that includes the loopback reply information, and then transmits the packet that includes the loopback reply information to the switch #1 while the setting of Level=0 is left as it is.

In the present embodiment, the destination of the loopback is the switch #3. However, for example, if the destination is the switch ahead of the switch #3, the loopback packet of the second level for the second maintenance section is forwarded from the switch #3 to the switch #4 and is given the loopback processing in the switch #4 based on the loopback information. Alternatively, the packet is termination-processed and discarded.

Further, in the present embodiment, the level of the packet forwarded in a specific management section is set to Level=0 or Level=1. However, the level can be set to other values.

(b) Switch Configuration

Figure 14:
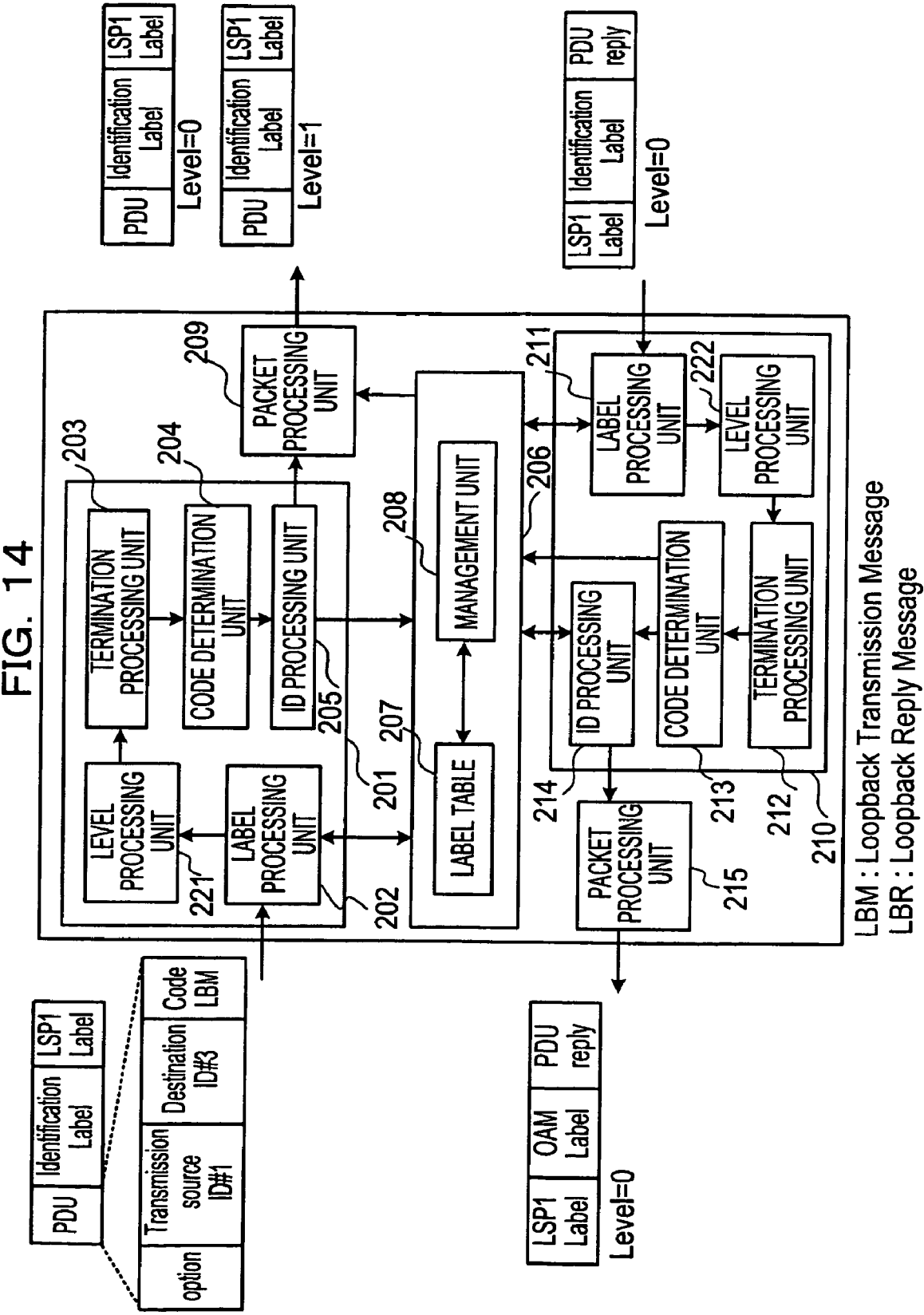
FIG. 14 depicts a configuration diagram of a switch according to the fifth embodiment.

FIG. 14 is a configuration diagram of the switch (the switch #2) according to the present embodiment.

In FIG. 14, the reference numbers 221 and 222 indicate a level processing unit. The same devices as those of the first embodiment are indicated with the same numbers, and the descriptions are omitted.

The level processing units 221 and 222 identify the level defined in the identification label or the PDU attached to the packet, and then set the level.

According to the present invention, loopback can be performed effectively in the switch that performs the packet forwarding processing based on the label.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch that performs packet forwarding processing based on a label for a connection in which a communication path is specified by the label, the switch comprising:
 a receiving unit that receives a packet including loopback information with a label of a first layer used for packet forwarding for a first connection from an adjacent apparatus forming the first connection with the switch, the loopback information comprising a destination identifier that identifies a return point of the packet; and
 a packet processing unit that transmits, when the destination identifier does not correspond to the switch, a first loopback packet that is the received packet to which is added a label of a second layer used for packet forwarding for a second connection to an adjacent apparatus forming the second connection with the switch, the second connection being that of an upper layer of the first connection, and also transmits a second loopback packet that is the received packet having the label of the first layer replaced by the label of the second layer.

2. The switch according to claim 1, wherein the packet processing unit has the packet including the loopback information and the label of the second layer, and then transmits the second loopback packet that does not have the label of the first layer.

3. The switch according to claim 1, wherein the receiving unit determines the information included in the packet based on an identification label for identifying that the received packet is a packet including the loopback information.

4. The switch according to claim 1, comprising a memory unit that stores a transmission source ID included in the packet including the loopback information received by the receiving unit, in association with a label of the first layer used to forward the packet to the transmission source.

5. The switch according to claim 3, wherein the switch refers to the memory unit when the second loopback packet that is returned in accordance with the loopback information is received, and transmits the packet having the label of the first layer corresponding to the packet including the loopback information and the transmission source ID when a destination ID included in the second loopback packet corresponds to the transmission source ID stored in the memory unit.

6. The switch according to claim 1, wherein after receiving the second loopback packet that is returned in accordance with the loopback information within a given time, when the packet processing unit receives a third loopback packet including the loopback information with a new label of the first layer that has the same destination ID as the destination ID of the loopback information, the packet processing unit transmits the third loopback packet without transmitting the first loopback packet.

7. The switch according to claim 1, wherein if the second loopback packet is not returned in accordance with the loopback information within the given time when the packet processing unit receives a third loopback packet including the loopback information with a new label of the first layer having the same destination ID as that of the loopback information, the packet processing unit transmits the third loopback packet without transmitting the second loopback packet.

8. The switch according to claim 1, wherein the packet processing unit sets a value of Time To Live (TTL) of a label of the second layer to be attached to the second loopback packet according to a number of switches on the second connection.

9. The switch according to claim 8, wherein the level is set in a data area included in the label attached to the packet including the loopback information.

10. The switch according to claim 8, wherein the level is set in a data area included in the packet including the loopback information.

11. A switch that performs packet forwarding based on a label for a connection in which a communication path is specified by the label, and is capable of setting a management section in layers to the connection, the switch comprising:
 a receiving unit that receives a packet including loopback information from an adjacent apparatus forming the first connection with the switch, the loopback information comprising a destination identifier that identifies a return point of the packet; and a packet processing unit that transmits, when the destination identifier does not correspond to the switch, a first loopback packet that is the received packet to which is added a second level loopback information that is set as a second level in such a way that packet forwarding is performed in a second management section that is included in a first management section and is also layered for the first management section, and also transmits a second loopback packet that is the received packet having a first level loopback information that is set as a first level replaced by the second level loopback information.

12. A packet forwarding method of a switch that performs packet forwarding processing based on a label for a connection in which a communication path is specified by the label, the packet forwarding method comprising:

receiving a packet including loopback information with a label of a first layer used for packet forwarding for a first connection from an adjacent apparatus forming the first connection with the switch, the loopback information comprising a destination identifier that identifies a return point of the packet; and transmitting, when the destination identifier does not correspond to the switch, a first loopback packet that is the received packet to which is added a label of a second layer used for the packet forwarding for a second connection to an adjacent apparatus forming the second connection with the switch, the second connection being that of an upper layer of the first connection, and also transmitting a second loopback packet that is the received packet having the label of the first layer replaced by the label of the second layer but which does not have the label of the first layer.

* * * * *